US008812873B2

(12) United States Patent
Goffman et al.

(10) Patent No.: US 8,812,873 B2
(45) Date of Patent: Aug. 19, 2014

(54) SECURE EXECUTION OF A COMPUTER PROGRAM USING BINARY TRANSLATORS

(71) Applicant: Intel Corporation, Santa Clara, CA (US)

(72) Inventors: Sergei Goffman, Haifa (IL); Alexander Skaletsky, Tzoran (IL)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 13/627,866

(22) Filed: Sep. 26, 2012

(65) Prior Publication Data

US 2014/0089679 A1    Mar. 27, 2014

(51) Int. Cl.
G06F 21/00 (2013.01)
G06F 9/455 (2006.01)
G06F 12/10 (2006.01)

(52) U.S. Cl.
CPC .............. *G06F 9/455* (2013.01); *G06F 12/109* (2013.01)
USPC .......................................................... 713/190

(58) Field of Classification Search
CPC .............................. G06F 9/455; G06F 12/109
See application file for complete search history.

(56) References Cited

U.S. PATENT DOCUMENTS

| | | | |
|---|---|---|---|
| 4,817,140 | A | 3/1989 | Chandra et al. |
| 7,051,211 | B1 | 5/2006 | Matyas, Jr. et al. |
| 2004/0064723 | A1 | 4/2004 | Barnes et al. |
| 2005/0210287 | A1 | 9/2005 | Paatero |
| 2006/0095793 | A1* | 5/2006 | Hall ............................. 713/190 |
| 2007/0133789 | A1 | 6/2007 | Scheiblhofer et al. |
| 2008/0059812 | A1 | 3/2008 | Everett et al. |
| 2009/0187750 | A1* | 7/2009 | Bugnion ....................... 712/244 |
| 2010/0153745 | A1 | 6/2010 | Onno et al. |
| 2011/0154002 | A1* | 6/2011 | Liu et al. ...................... 712/234 |
| 2013/0080805 | A1* | 3/2013 | Vick et al. ..................... 713/320 |
| 2014/0047245 | A1 | 2/2014 | Goffman et al. |

FOREIGN PATENT DOCUMENTS

TW             201337620 A     9/2013
WO    WO2013/101034 A1     7/2013

OTHER PUBLICATIONS

International Search Report and Written Opinion mailed Sep. 24, 2012 for International Application No. PCT/US2011/067781, 12 pages.
International Search Report and Written Opinion mailed Dec. 12, 2012 for International Application No. PCT/US2012/040597, 11 pages.

* cited by examiner

*Primary Examiner* — Hadi Armouche
*Assistant Examiner* — Dao Ho
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein to provide a computing device with cooperative first and second binary translators in first and second execution environments having first and second security levels, respectively. The second security level may be more secure than the first security level. Encrypted instructions of the computer program may be loaded into the first execution environment, and the first binary translator may provide, to the second binary translator, an execution context of the computer program for use by the secondary binary translator to decrypt and execute a first portion of the computer program in the second execution environment. The second binary translator may provide, to the first binary translator, another execution context of the computer program for emulation, by the first binary translator, of execution of a second portion of the computer program in the first execution environment.

22 Claims, 4 Drawing Sheets

SECURE EXECUTION OF A COMPUTER PROGRAM USING BINARY TRANSLATORS

FIELD

Embodiments of the present invention relate generally to the technical field of data processing, and more particularly, to securely execute a computer program using binary translators.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Software piracy and/or tampering (such as virus or malware) are widespread. Conventional anti-piracy/tampering measures such as code obfuscation, encryption and anti-debugging techniques have failed to adequately address the problem, particularly against the most determined software pirates/hackers. More robust anti-piracy/tampering measures such as hardware keys (e.g., one-time passwords on key-ring dongles), while more effective, may be inconvenient, expensive and/or inflexible.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

As used herein, the terms "software" and "computer program" may include but are not limited to one or more instructions stored on a transitory or non-transitory medium that, when executed by a computing device, enables the computing device to perform various actions. Non-limiting examples of software and computer programs include word processors, spreadsheets, image manipulation applications, games, media players, email clients, web browsers, operating systems, drivers, servers (e.g., a web server), and so forth.

Figure 1:
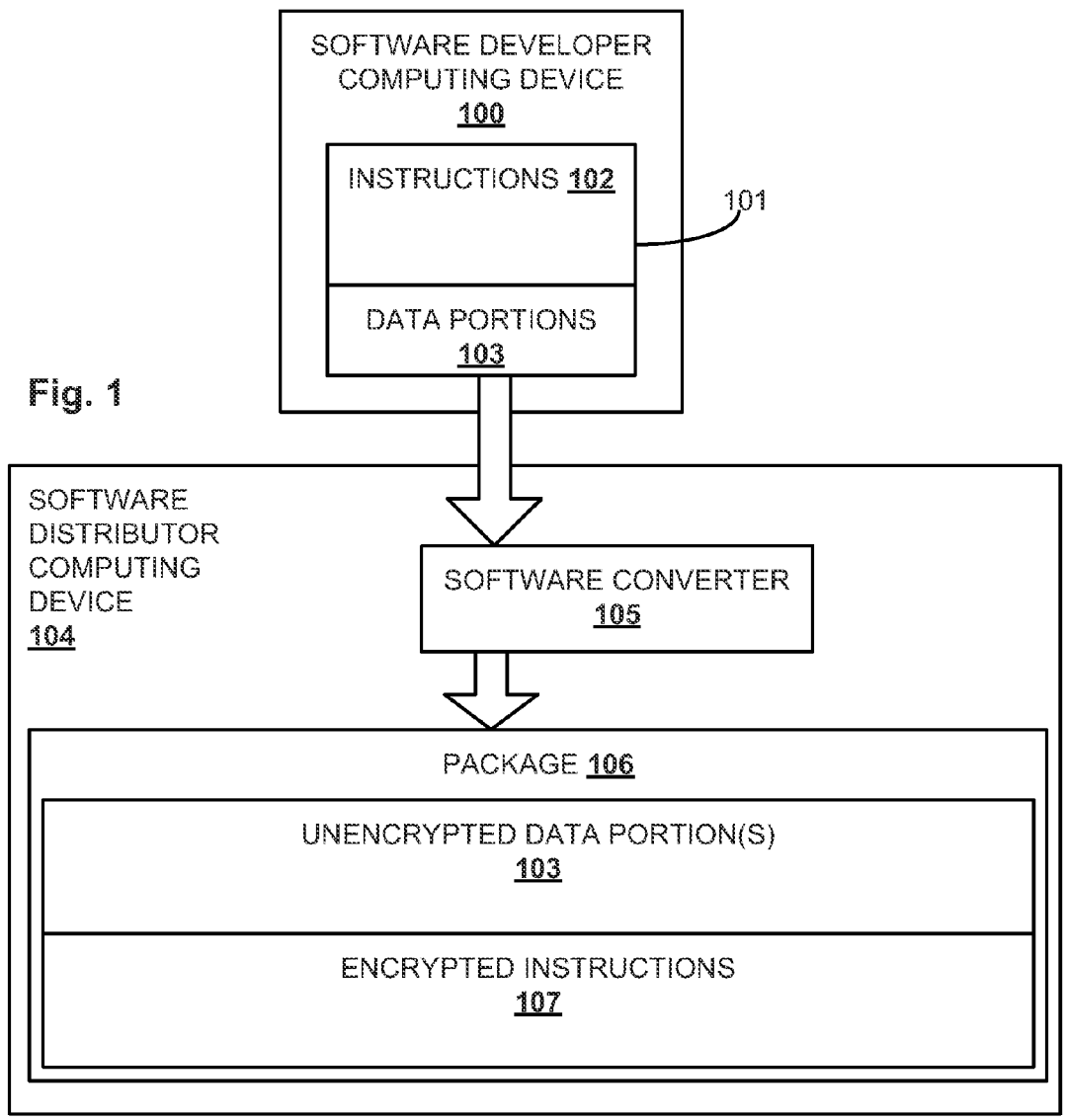
FIG. 1 schematically illustrates an example of how software in the form of a plurality of executable instructions may be created, provided to a software distributor such as an application store, and incorporated into a package to provide enhanced security, in accordance with various embodiments.

Referring now to FIG. 1, a software developer computing device 100 may be one or more computing devices used by a person or group of persons, e.g., a software development firm, company, independent software vender ("ISV") and so forth, to develop a computer program 101 that includes a plurality of instructions 102 and one or more data portions 103. In various embodiments, plurality of instructions 102 may include source code, binary instructions, assembly code, scripting language, and/or any other type of instructions that may be executed immediately or after some form of preprocessing, such as compilation, assembly, interpretation, and so forth. In various embodiments, the one or more data portions 103 may include portions of memory allocated or otherwise reserved for data used and/or manipulated by computer program 101 when executed.

As shown by the arrow in FIG. 1, in various embodiments, software developer computing device 100 may provide computer program 101 to a software distributor computing device 104, although this is not required. In various embodiments, software developer computing device 100 may provide computer program 101 to software distributor computing device 104 over one or more wired and/or wireless communication networks, by mailing or otherwise physically transferring a computer-readable medium storing computer program 101, and so forth.

In various embodiments, software distributor computing device 104 may host an online application store or other service that distributes software via any medium, such as over one or more wired and/or wireless communication networks, or physically, by mailing or otherwise physically transferring computer-readable media. In some embodiments, software developer computing device 100 and software distributor computing device 104 may be the same computing device or a plurality of computing devices operating in cooperation.

Computer program 101 may, by itself, not include sufficient safeguards against software piracy and/or tampering. A user may be able to view plurality of instructions 102, e.g., before, during, or after execution. This may allow the user to copy or modify plurality of instructions 102 in an undesirable manner. For instance, a user could edit plurality of instructions 102 to remove copyright protection mechanisms. Even if plurality of instructions 102 is in a form not readily readable by humans (e.g., object code), a determined software pirate may have reverse engineering capabilities. As a further example, a hacker may tamper with plurality of instructions 102.

Accordingly, in various embodiments, computer program 101 may be converted, e.g., by a software converter 105, to a package 106 with characteristics that prevent, reduce the likelihood of and/or generally discourage software piracy/tampering. For example, plurality of instructions 102 may be encrypted into an encrypted plurality of instructions 107. As will be described below, these encrypted instructions 107 later may be decrypted, configured, and executed. In particular, these encrypted instructions 107 later may be decrypted, configured, and executed in a separate, more secure environment that prevents users from accessing the instructions, using binary translators. In embodiments, computer program 101 may be converted by software converter 105 to package 106, with or without recognition of the manner in which package 106 is decrypted and executed.

In various embodiments, security of one or more data portions 103 may not be as important as the security of plurality of instructions 102. For example, if computer program 101 is digital image editing software, the creator of the software may be more concerned about preventing piracy of computer program 101 itself, than preventing piracy of data otherwise utilized by computer program 101. Similarly, a computer game may include interspersed cinematic sequences that include audio/video data files that need not necessarily be protected. Accordingly, in various embodiments, one or more data portions 103 may remain unencrypted.

Software converter 105 may be any combination of software and/or hardware. In FIG. 1, it is shown operating on software distributor computing device 104. However, this is not meant to be limiting, and software converter 105 may operate on other computing devices, such as software developer computing device 100. After conversion by software converter 105, package 106 may include an encrypted plurality of instructions 107 and one or more unencrypted data portions 101

Figure 2:
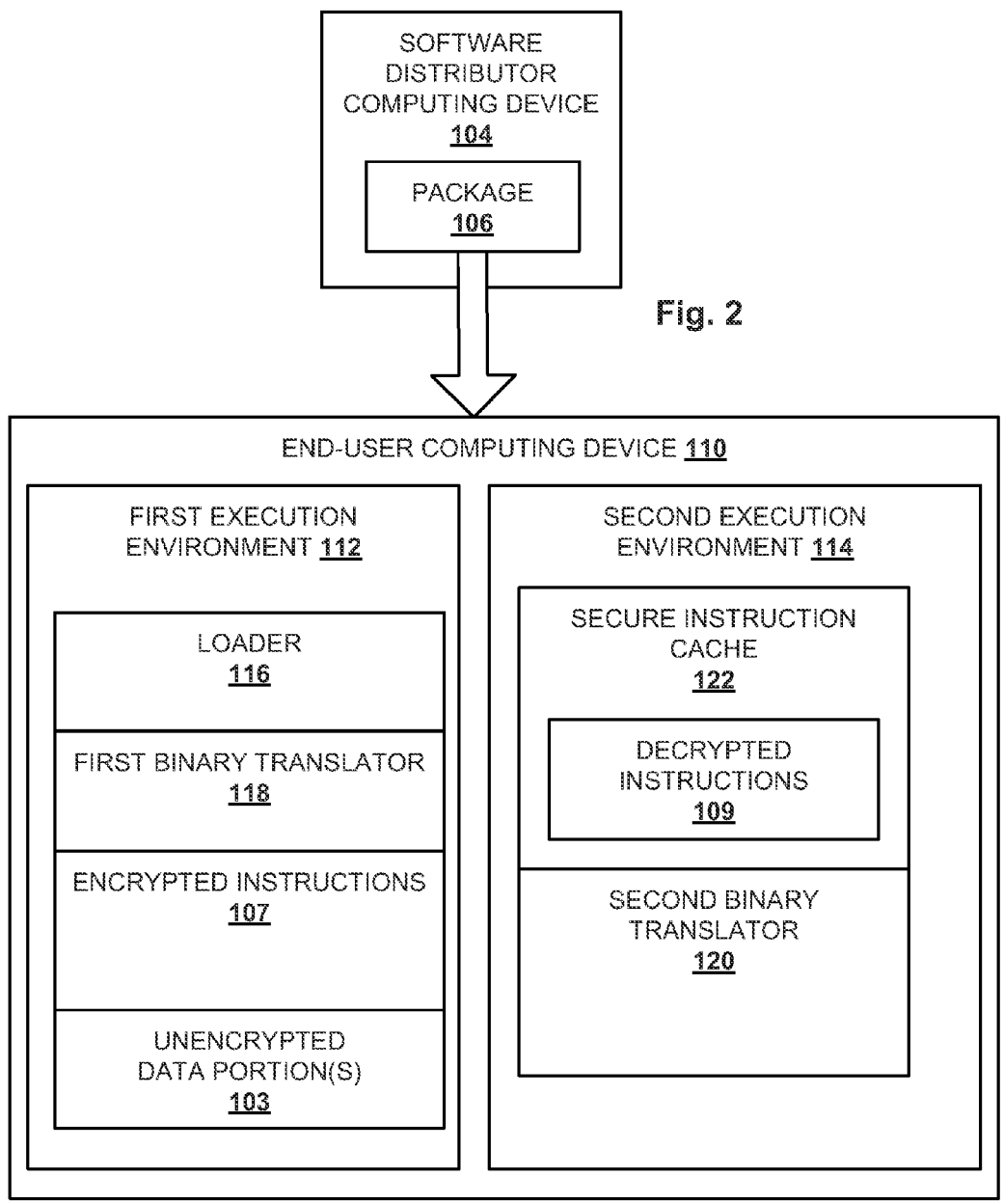
FIG. 2 schematically illustrates an example of how the package may be provided to an end user system and executed in a manner that enhances security, in accordance with various embodiments.

Referring to FIG. 2, converted package 106 may be distributed to one or more end users for execution on one or more end-user computing devices 110. As will be discussed in more detail below, end-user computing device 110 may be configured to load encrypted plurality of instructions 107 and one or more unencrypted data portions 103 in a first execution environment 112 with a first security level. End-user computing device 110 may be configured to decrypt, configure, and execute encrypted plurality of instructions 107 in a second execution environment 114 with a second security level that is more secure than the first security level, in various embodiments, in second execution environment 114, instructions and the nature of their execution may be hidden from the user. For example, instructions executed in second execution environment 114 may be stored in secure memory, such as a secure instruction cache 122 that will be described below. This may make it more difficult for a user to copy or reverse engineer plurality of instructions 102.

At various times, such as at runtime of computer program 101, a loader 116 may load encrypted plurality of instructions 107 and one or more unencrypted data portions 103 of package 106 into memory (not shown) associated with first execution environment 112. Being encrypted, there may not be a discernable starting point for execution of encrypted plurality of instructions 107. Accordingly, in various embodiments, loader 116 may be configured to insert into or otherwise associate with encrypted plurality of instructions 107 one or more instructions (e.g., a dynamic linked library, or "DLL") to facilitate secure execution of computer program 101 in second execution environment 114, and to facilitate redirection between different execution environments, by first and second binary translators 118 and 120, in cooperation with each other.

For example, in various embodiments, loader 116 may insert and/or load one or more instructions (e.g., a DLL) to invoke a first binary translator 118 in first execution environment 112. In some instances, first binary translator 118 may be referred to as an "untrusted" binary translator because it operates in first execution environment 112. In various embodiments, instructions to invoke first binary translator 118 may be inserted before an entry point of encrypted plurality of instructions 107.

In various embodiments, once invoked, first binary translator 118 may perform various operations to facilitate execution of computer program 101 in second execution environment 114. For instance, in some scenarios, such as when second execution environment 114 is not yet invoked, or when a separate secure execution environment is established for each protected computer program, first binary translator 118 may invoke second execution environment 114

In various embodiments, first binary translator 118 may invoke a second binary translator 120 in second execution environment 114. Because second binary translator 120 executes in second execution environment 114, its operation may not be observable by a user, which may reduce a likelihood of software piracy. First binary translator 118 may then provide an initial execution context to second binary translator 120, so that second binary translator 120 may commence to facilitate secure execution of computer program 101. As used herein, the term "execution context" may refer to the context in which instructions are executed, and may include but is not limited to various values stored in general purpose registers ("GPRs") and/or FLAGS registers (e.g., EFLAGS, RFLAGS) during execution of the program.

To facilitate secure execution of computer program 101, second binary translator 120 may decrypt encrypted plurality of instructions 107 into decrypted instructions 109. As noted above, second execution environment 114 may include a secure instruction cache 122 for storing decrypted instructions 109 for execution. In some embodiments, the entirety of computer program 101 may be decrypted and stored in secure instruction cache 122. In other embodiments, second binary translator 120 may incrementally decrypt encrypted plurality of instructions 107 a portion at a time. In such case, second binary translator 120 may refrain from decrypting additional instructions of encrypted plurality of instructions 107 until the most recently decrypted instructions in secure instruction cache 122 are executed.

As noted above, one or more unencrypted data portions 103 associated with computer program 101 may remain unencrypted in first execution environment 112 during execution. In order to ensure that decrypted instructions 109 in secure instruction cache 122 execute properly, second binary translator 120 may configure decrypted instructions 109 so that they may be executed in second execution environment 114 while one or more associated unencrypted data portions 103 remain in first execution environment 112. For example, in various embodiments, second binary translator 120 may perform binary translation on decrypted instructions 109, and then store those decrypted and translated instructions back in secure instruction cache 122. In some embodiments, binary translation may be performed using tools similar to the PIN tool for dynamic instrumentation of programs, provided by the Intel® Corporation of Santa Clara, Calif.

In some embodiments, second execution environment 114 may have a different architecture (e.g., x86, RISC) than first execution environment 112. In such case, the binary translation may include generation of a semantic equivalent of decrypted instructions 109 for execution in second execution environment 114. In other embodiments, second execution environment 114 may have the same architecture as first execution environment 112. In either case, second binary translator 120 may perform a binary translation on decrypted instructions 109, e.g., before storing the instructions in secure instruction cache 122. This translation may serve to direct decrypted instructions 109 within second execution environment 114 to one or more unencrypted data portions 103 in first execution environment 112.

Once the decrypted and translated instructions are stored in secure instruction cache 122, they may then be securely executed. As noted above, first binary translator 118 may have provided or may provide, to second binary translator 120, at any time before, during or after the decryption and translation, at least a first execution context of computer program 101 to commence execution. Secondary binary translator 120 may use the first execution context to commence to facilitate secure execution, in second execution environment 114, of decrypted and translated instructions stored in secure instruction cache 122.

In various embodiments, some instructions of computer program 101 may not be executable within second execution environment 114. For example, instructions to, e.g., render graphics on a display (not shown), or to access various components of an operating system, may not be executable within second execution environment 114. Other instructions, such as shared libraries system DLLs), may be publicly available, and therefore may not benefit from or be suitable for execution in second execution environment 114. In either case, upon reaching such a portion of computer program 101, second binary translator 120 may provide, to first binary translator 118, a current execution context of computer program 101. Based on this current execution context, first binary translator 118 may emulate execution of the portion of computer program 101 in first execution environment 112.

Once first binary translator 118 completes emulation of execution of the portion of computer program 101, first binary translator 118 may provide, to second binary translator 120, another more current execution context. Upon receiving this most current execution context, second binary translator 120 may resume execution of computer program 101 in second execution environment 114, including additional decryption and/or configuration, if necessary.

In various scenarios, an underlying operating system and/or processor (both not shown) may have occasion to interrupt or otherwise obtain the attention of computer program 101. Examples of things that might cause an interrupt include but are not limited to input from a keyboard or mouse, a call from another program, a system or a network event, etc. An interrupt handler (not shown) of the operating system/processor may be triggered by the interrupt to provide a signal of the input to computer program 101. As another example, the operating system/processor may have occasion to send an exception to the computer program, e.g., if there is a system error. In either case, first binary translator 118 may be configured to intercept the signal or exception sent from the operating system/processor to the computer program. First binary translator 118 may then send a request to second binary translator 120 to invoke and execute an appropriate routine of computer program 101 to handle the signal or exception, including decryption and/or configuration of the routine, if necessary.

In various embodiments, the routine may not yet have been decrypted or configured (e.g., translated) by second binary translator 120. In such case, second binary translator 118 may decrypt and configure the routine into secure instruction cache 122, so that it may then be executed in second execution environment 114. For example, the routine may be configured by second binary translator 120 for execution in second execution environment 114 with one or more unencrypted data portions 103 of computer program 101 remaining loaded in memory associated with first execution environment 112.

In various embodiments, computer program 101 may be a multi-threaded application. In such case, first binary translator 118 may be configured to intercept a thread creation or termination event directed to the computer program, e.g., by the operating system. First binary translator 118 may then provide, to second binary translator 120, an initial execution context of the thread for use by secondary binary translator 120 to commence execution of the thread in second execution environment 114. In various embodiments, executable instructions of the thread may not yet have been decrypted or otherwise configured (e.g., translated). In such case, second binary translator 120 may decrypt and configure the thread for execution in second execution environment 114 with one or more unencrypted data portions 103 of computer program 101 remaining loaded in memory associated with the first execution environment 112.

Figure 3:
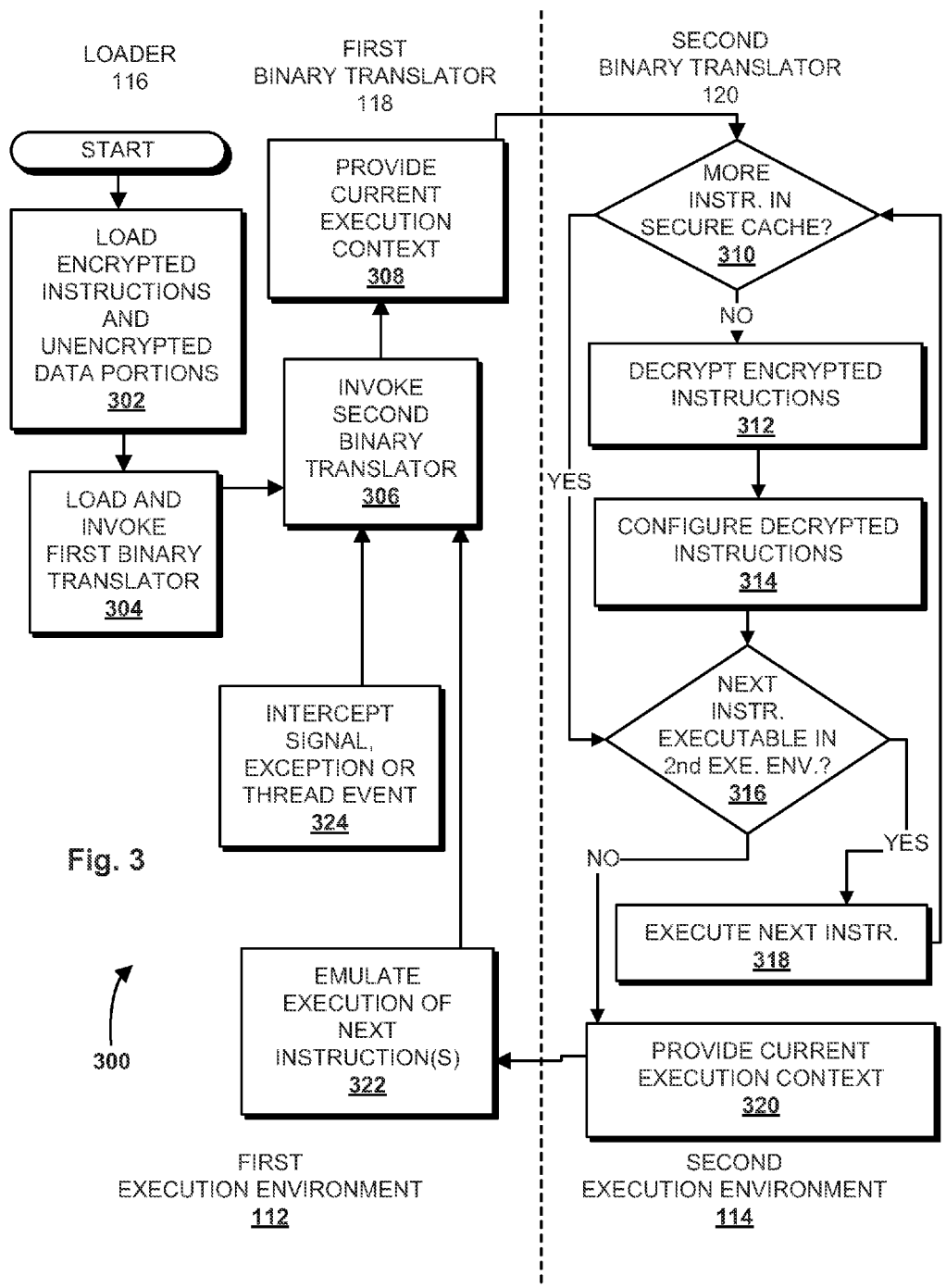
FIG. 3 schematically depicts an example method that may be implemented by various computing devices, in accordance with various embodiments.

FIG. 3 depicts an example method 300 that may be implemented by various components of a computing device, e.g., loader 116, first binary translator 118 and second binary translator 120, to securely execute computer program 101 cooperatively. At block 302, encrypted instructions 107 and one or more unencrypted data portions 103 of computer program 101 may be loaded, e.g., by loader 116, in first execution environment 112 of end-user computing device 110 having a first security level. At block 304, one or more instructions (e.g., a DLL) may be added to computer program 101, e.g., by loader 116, to facilitate invocation of first binary translator 118.

At block 306, after having been invoked, first binary translator 118 may invoke second binary translator 120. At block 308, first binary translator 118 may provide, to second binary translator 120, an execution context. If computer program 101 has just been initiated, then this context may be an initial execution context. Execution may then transition from first execution environment 112 to second execution environment 114.

At block 310, it may be determined, e.g., by second binary translator 120, whether there are decrypted and/or configured (e.g., translated) instructions in secure instruction cache 122 available to be executed. If the answer is yes, then method 300 may proceed to block 316, described below. If the answer is no, then at block 312, at least the encrypted instructions of computer program 101 to be executed next may be decrypted in second execution environment 114. For example, encrypted instructions 107 to be executed next may be decrypted within second execution environment 114 and stored in secure instruction cache 122. At block 314, the decrypted instructions 109 may be configured, e.g., translated by second binary translator 120 in second execution environment 114, for execution in second execution environment 114. As noted above, one or more unencrypted data portions 103 of computer program 101 may remain in memory associated with first execution environment 112.

At block 316, it may be determined, e.g., by second binary translator 120, whether the next instruction or instructions to be executed, which may be stored in secure instruction cache 122, are executable or suitable for execution in second execution environment 114. If the answer is yes, then at block 318, second binary translator 120 may execute those instructions. If, on the other hand, the answer is no (e.g., where the instructions are a system routine), then method 300 may proceed to block 320. At block 320, a current execution context may be provided, e.g., by second binary translator 120 to first binary translator 118, and execution may transition back to first execution environment 112.

At block 322, based on this new execution context, execution of the instruction(s) that were not executable or otherwise unsuitable for execution in second execution environment 114 may be emulated, e.g., by first binary translator 118 in first execution environment 112. Method 300 may then proceed back to block 306, in which first binary translator 118 invokes second binary translator 120 once again. At block 308, a current execution context may again be provided, e.g., by first binary translator 118 to second binary translator 120. Method 300 may then proceed back to block 310 as described above.

While computer program 101 is running, as earlier described, various asynchronous events may occur that require action by computer program 101. For example, an exception may be raised by an operating system, e.g., upon failure of some hardware or software component, or an interrupt may be processed by the operating system, e.g., when a user provides input via a keyboard or mouse, causing the operating system to send a signal to computer program 101. Or, if computer program 101 is a multi-threaded program, another thread may be initiated. In various embodiments, the operating system may operate outside of second execution environment 114. Accordingly, at block 324, a signal, exception or thread initiation event, e.g., from an operating system to computing program 101, may be intercepted, e.g., by first binary translator 118. Method 300 may then proceed to block 306, in which case first binary translator 118 may request that second binary translator 120 execute a particular routine to handle the signal, exception or thread.

Figure 4:
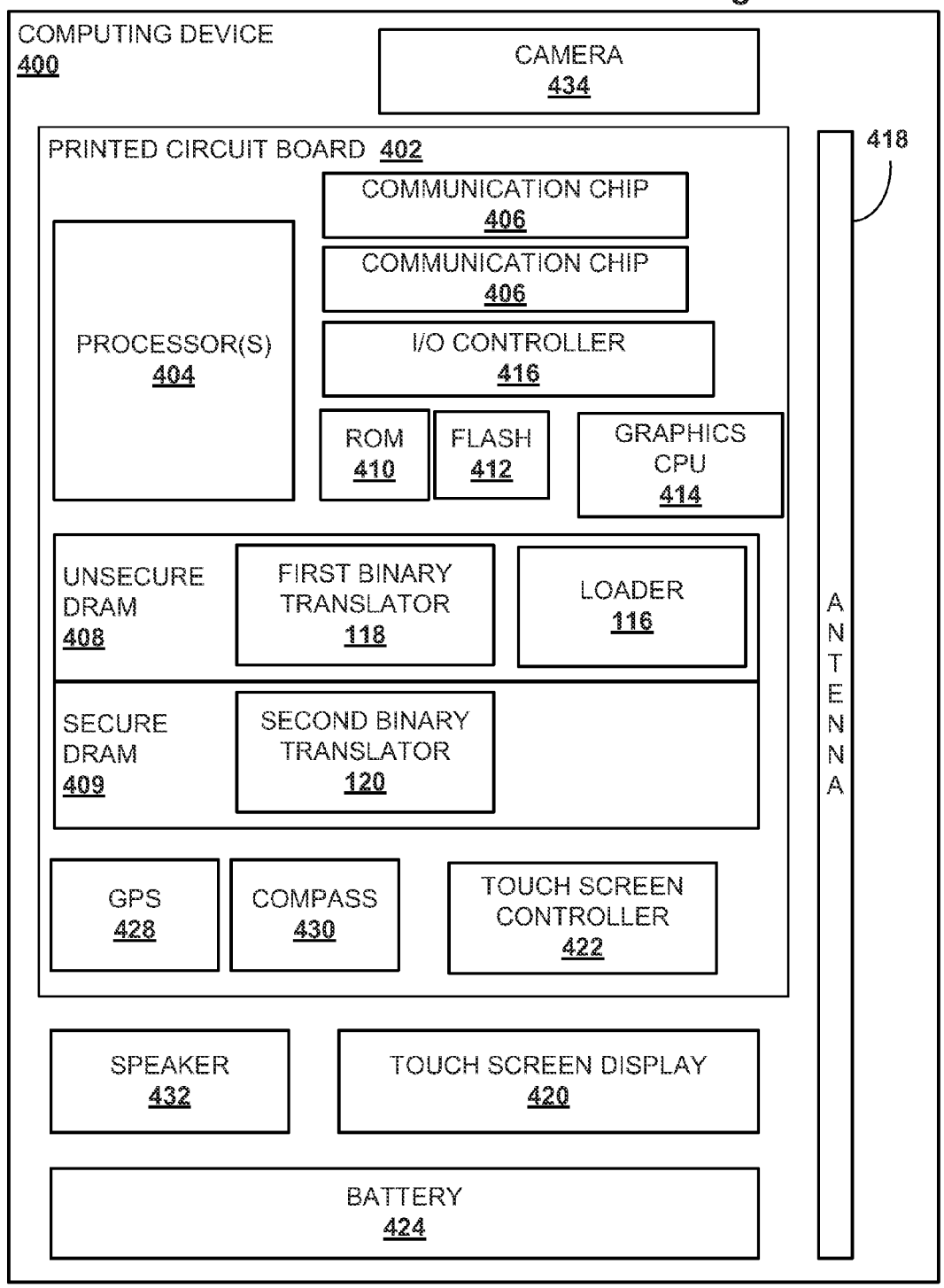
FIG. 4 schematically depicts an example computing device on which disclosed methods and computer-readable media may be implemented, in accordance with various embodiments.

FIG. 4 illustrates an example computing device 400, in accordance with various embodiments. Computing device 400 may include a number of components, a processor 404 and at least one communication chip 406. In various embodiments, the processor 404 may be a processor core or may comprise multiple processor cores. In various embodiments, the at least one communication chip 406 may also be physically and electrically coupled to the processor 404. In further implementations, the communication chip 406 may be part of the processor 404. In various embodiments, computing device 400 may include printed circuit board ("PCB") 402. For these embodiments, processor 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. For example, these other components may include volatile memory, e.g., in the form of dynamic random access memory, or "DRAM." The system 400 in FIG. 4 includes unsecure DRAM 408, which may be associated with a. "less" secure execution environment such as first execution environment 112, and secure DRAM 409, which may be associated with a "more" secure execution environment such as second execution environment 114.

Other components may include, but are not limited to, non-volatile memory (e.g., read only memory 410, also referred to as "ROM"), flash memory 412, a graphics processor 414, a digital signal processor (not shown), a crypto processor (not shown), an input/output ("I/O") controller 416, an antenna 418, a display (not shown), a touch screen display 420, a touch screen controller 422, a battery 424, an audio codec (not shown), a video codec (not shown), a global positioning system ("GPS") device 428, a compass 430, an accelerometer (not shown), a gyroscope (not shown), a speaker 432, a camera 434, and a mass storage device (such as hard disk drive, a solid state drive, compact disk ("CD"), digital versatile disk ("DVD")) (not shown), and so forth. In various embodiments, the processor 404 may be integrated on the same die with other components to form a System on Chip ("SoC").

In various embodiments, volatile memory (e.g., unsecure DRAM 408 and secure DRAM 409), non-volatile memory (e.g., ROM 410), flash memory 412, and the mass storage device may include programming instructions configured to enable computing device 400, in response to execution by processor(s) 404, to practice all or selected aspects of method 300, e.g., by operating loader 116, first binary translator 118 in first execution environment 112, and/or second binary translator 120 in second execution environment 114. For example, one or more of the memory components such as unsecure DRAM 408, secure DRAM 409, non-volatile memory (e.g., ROM 410), flash memory 412, and the mass storage device may include temporal and/or persistent copies of instructions configured to enable computing device 400 to practice disclosed techniques, such as all or selected aspects of method 300.

The communication chip 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various embodiments, processor 404 (or one of its processor cores) may be packaged together with loader 116, first binary translator 118 and/or second binary translator 120. For one embodiment, processor 404 (or one of its processor cores) may be packaged together with these and/or other components to form a System in Package ("SiP"). For one embodiment, processor 404 (or one of its processor cores) may be packaged together with these and/or other components, and may be integrated on the same die. For one embodiment, processor 404 (or one of its processor cores) may be packaged together with these and/or other components to form a System on Chip ("SoC").

In various implementations, the computing device 400 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 400 may be any other electronic device that processes data.

Embodiments of apparatus, computer-implemented methods, systems, devices, and computer-readable media (transitory and non-transitory) are described herein to provide a computing device with a first binary translator which may execute in a first execution environment of the computing device having a first security level. In various embodiments, the first binary translator may cooperate with a second binary translator within a second execution environment of the computing device with a second security level that is more secure than the first security level to securely execute a computer program in the second execution environment. In various embodiments, instructions of the computer program may be encrypted and loaded into the first execution environment. In various embodiments, cooperation may include provision by the first binary translator to the second binary translator of a first execution context of the computer program for use by the secondary binary translator to decrypt and execute a first portion of the computer program in the second execution environment. In various embodiments, cooperation may also include provision by the second binary translator to the first binary translator of a second execution context of the computer program for emulation, by the first binary translator, of execution of a second portion of the computer program in the first execution environment.

In various embodiments, cooperation may include provision by the first binary translator, to the second binary translator, of a third execution context of the computer program for the second binary translator to resume decryption and execution of the computer program in the second execution environment. In various embodiments, provision of the third execution context may be based at least in part on a result of the emulated execution of the second portion of the computer program in view of the second execution context.

In various embodiments, cooperation may include configuration of the first portion of the computer program by the second binary translator for execution in the second execution environment with one or more unencrypted data portions of the computer program loaded in memory associated with the first execution environment. In various embodiments, the configuration may include generation of a semantic equivalent of an instruction of the first portion of the computer program for execution in the second execution environment.

In various embodiments, the second portion of the computer program may be a shared library. In various embodiments, the cooperation may include interception by the first binary translator of a signal or exception sent from an operating system of the computing device to the computer program. In various embodiments, the cooperation may include, responsive to a request by the first binary translator, execution by the second binary translator of a routine of the computer program to handle the signal or exception. In various embodiments, cooperation may include configuration of the routine by the second binary translator for execution in the second execution environment with one or more unencrypted data portions of the computer program loaded in memory associated with the first execution environment.

In various embodiments, cooperation may include interception by the first binary translator of a thread creation or termination event directed to the computer program, and provision by the first binary translator to the second binary translator of an execution context of the thread for use by the secondary binary translator to decrypt and execute at least a portion of the thread in the second execution environment. In various embodiments, cooperation may include configuration of the portion of the thread by the second binary translator for execution in the second execution environment with one or more unencrypted data portions of the computer program loaded in memory associated with the first execution environment.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium comprising computer-readable code embodied therein, the computer-readable code to provide a computing device with a first binary translator, which in response to execution of the code in a first execution environment of the computing device having a first security level, cooperates with a second binary translator, wherein the second binary translator is within a second execution environment of the computing device with a second security level that is more secure than the first security level, to securely execute a computer program in the second execution environment;

wherein instructions of the computer program are encrypted and loaded into the first execution environment; and wherein cooperation includes provision by the first binary translator to the second binary translator of a first execution context of the computer program for use by the secondary binary translator to decrypt and execute a first portion of the computer program in the second execution environment, provision by the second binary translator to the first binary translator of a second execution context of the computer program for emulation, by the first binary translator, of execution of a second portion of the computer program in the first execution environment, and provision by the first binary translator, to the second binary translator, of a third execution context of the computer program for the second binary translator to resume decryption and execution of the computer program in the second execution environment, wherein provision of the third execution context is based at least in part on a result of the emulated execution of the second portion of the computer program in view of the second execution context.

2. The at least one non-transitory computer-readable medium of claim 1, wherein cooperation further includes configuration of the first portion of the computer program by the second binary translator for execution in the second execution environment with one or more unencrypted data portions of the computer program loaded in memory associated with the first execution environment.

3. The at least one non-transitory computer-readable medium of claim 2, wherein the configuration comprises generation of a semantic equivalent of an instruction of the first portion of the computer program for execution in the second execution environment.

4. The at least one non-transitory computer-readable medium of claim 1, wherein the second portion of the computer program comprises a shared library.

5. The at least one non-transitory computer-readable medium of claim 1, wherein the cooperation further comprises interception by the first binary translator of a signal or exception sent from an operating system of the computing device to the computer program, and, responsive to a request by the first binary translator, execution by the second binary translator of a routine of the computer program to handle the signal or exception.

6. The at least one non-transitory computer-readable medium of claim 5, wherein cooperation further includes configuration of the routine by the second binary translator for execution in the second execution environment with one or more unencrypted data portions of the computer program loaded in memory associated with the first execution environment.

7. The at least one non-transitory computer-readable medium of claim 1, wherein the cooperation further comprises interception by the first binary translator of a thread creation or termination event directed to the computer program, and provision by the first binary translator to the second binary translator of an execution context of the thread for use by the secondary binary translator to decrypt and execute at least a portion of the thread in the second execution environment.

8. The at least one non-transitory computer-readable medium of claim 7, wherein cooperation further includes configuration of the portion of the thread by the second binary translator for execution in the second execution environment with one or more unencrypted data portions of the computer program loaded in memory associated with the first execution environment.

9. A computer-implemented method, comprising:
loading, by a computing device, in a first execution environment of the computing device having a first security level encrypted instructions and unencrypted data portions of a computer program;
decrypting and executing, by the computing device, based on a first execution context of the computer program, a first portion of the computer program, wherein the decryption and execution occur within a second execution environment of the computing device with a second security level that is more secure than the first security level;
emulating, by the computing device, within the first execution environment, execution of a second portion of the computer program based on a second execution context of the computer program; and
decrypting and executing, by the computing device in the second execution environment, a third portion of the computer program, based on a third execution context of the computer program, wherein the third execution context is based at least in part on a result of the emulated execution of the second portion of the computer program in view of the second execution context.

10. The computer-implemented method of claim 9, further comprising configuring, by the computing device in the second execution environment, the first portion of the computer program for execution in the second execution environment with one or more unencrypted data portions of the computer program remaining in memory associated with the first execution environment.

11. The computer-implemented method of claim 10, wherein the configuring further comprises generating, by the computing device, a semantic equivalent of an instruction of the first portion of the computer program for execution in the second execution environment.

12. The computer-implemented method of claim 9, wherein the second portion of the computer program comprises instructions not executable or suitable for execution in the second execution environment.

13. The computer-implemented method of claim 9, further comprising intercepting, by the computing device in the first execution environment, a signal or exception sent from an operating system of the computing device to the computer program, and decrypting and executing, by the computing device in the second execution environment, at least a portion of a routine of the computer program to handle the signal or exception.

14. The computer-implemented method of claim 13, further comprising configuring, by the computing device in the second execution environment, the portion of the routine for execution in the second execution environment with one or more unencrypted data portions of the computer program remaining in memory associated with the first execution environment.

15. The computer-implemented method of claim 9, further comprising intercepting, by the computing device in the first execution environment, a thread creation or termination event directed to the computer program, and decrypting and executing at least a portion of the thread, by the computing device in the second execution environment, based on an execution context generated in the first computing environment.

16. The computer-implemented method of claim 15, further comprising configuring, by the computing device in the second execution environment, the portion of the thread for execution in the second execution environment with one or more unencrypted data portions of the computer program remaining in memory associated with the first execution environment.

17. A system comprising:
one or more processors;
a first execution environment having a first security level and a memory coupled to the one or more processors;
a second execution environment having a second security level that is more secure than the first security level;
a loader to be operated by the one or more processors in the first execution environment to load encrypted instructions of a computer program into the memory, and to facilitate invocation of a first binary translator in the first execution environment;
the first binary translator to invoke a second binary translator, wherein the second binary translator is in the second execution environment, and to provide to the second binary translator a first execution context of the computer program for use by the secondary binary translator to decrypt and securely execute a first portion of the computer program in the second execution environment;

the second binary translator to provide to the first binary translator a second execution context of the computer program for emulation, by the first binary translator, of execution of a second portion of the computer program in the first execution environment; and wherein the first binary translator is further to provide, to the second binary translator, a third execution context of the computer program for the second binary translator to resume decryption and secure execution of the computer program in the second execution environment, wherein provision of the third execution context is based at least in part on a result of the emulated execution of the second portion of the computer program in view of the second execution context.

18. The system of claim 17, wherein the second binary translator is further to configure the computer program for execution in the second execution environment with one or more unencrypted data portions of the computer program loaded in the memory of the first execution environment.

19. The system of claim 18, wherein the configuration comprises generation of a semantic equivalent of an instruction of the computer program for execution in the second execution environment.

20. The system of claim 17, wherein the portion of the computer program comprises a shared library.

21. The system of claim 17, wherein:
the first binary translator is further to intercept a signal or exception sent from an operating system of the computing device to the computer program, and to request execution by the second binary translator of a routine of the computer program to handle the signal or exception; and the second binary translator is further to configure and facilitate execution of at least a portion of the routine in the second execution environment with one or more unencrypted data portions of the computer program loaded in memory associated with the first execution environment.

22. The system of claim 17, further comprising a touch screen display.

* * * * *